United States Statutory Invention Registration [19]

[11] Reg. Number: H762

DeMasi et al. [43] Published: Apr. 3, 1990

[54] POST-PASTEURIZATION

[75] Inventors: Thomas W. DeMasi; Karl R. Deily, both of Greenville, S.C.

[73] Assignee: W. R. Grace & Co.-Conn., Duncan, S.C.

[21] Appl. No.: 334,834

[22] Filed: Apr. 7, 1989

[51] Int. Cl.[4] ..... A23L 1/31

[52] U.S. Cl. ..... 426/112; 426/113; 426/129; 426/394; 426/412

*Primary Examiner*—Matthew A. Thexton
*Assistant Examiner*—Joseph D. Anthony
*Attorney, Agent, or Firm*—John J. Toney; William D. Lee, Jr.; Mark B. Quatt

[57] ABSTRACT

Precooked food products, especially meat products, which have been unpackaged and further processed, are repackaged in a heat tolerant structure and exposed to temperatures of between about 160° F. and 205° F. for 30 seconds to 10 minutes, time and temperature depending on the particular product. This post pasteurization treatment extends the shelf life of the product.

4 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POST-PASTEURIZATION

BACKGROUND OF THE INVENTION

The present invention relates to the processing of food products and more particularly to the further processing of cooked meat products.

The processed meat industry is a large and growing portion of the total food packaging market.

"Processed meats" includes luncheon meats, smoked meat products, reconstituted and other forms of meat which are often packaged and sometimes repackaged, and also often cooked before shipping to a point of sale.

Cooking containers, typically thermoplastic bags such as the CN bags available from W. R. Grace & Co.-Conn. through its Cryovac Division, are often used in packaging and cooking processed meats.

A typical practice in the processed meats industry is to strip the cook-in bag from the processed meat after cooking, followed by some form of further processing. This further processing can include the addition of colorants and seasonings, slicing of the processed meat product to smaller portions, glazing and the like.

While these further processing procedures are often done to enhance the value and marketability of the processed meat products, they can also result in undesirable recontamination of the product surface with microrganisms which the cooking process would have typically destroyed.

The inventor has found that by taking such reprocessed cooked meats or other types of processed meat items, and placing them in a heat tolerant container such as a cooking bag, and exposing the repackaged product to a heat treatment of the product surface, a reduction in the bacterial load which was reintroduced to the product surface is obtained.

Reprocessing can involve submerging the resurfaced product in hot water (160° F. to 205° F.), or a comparable medium for dwell times ranging from 30 seconds to 10 minutes.

SUMMARY OF THE INVENTION

In one aspect of the invention, a method of treating cooked meat products comprises packaging the cooked meat product in a flexible heat tolerant container; placing the packaged meat product in a heated medium kept at a temperature between about 160° F. and 205° F.; and maintaining the package in the heated medium for between about 30 seconds and 10 minutes.

In another aspect of the invention, the invention comprises a packaged meat product which has been cooked in a bag or casing; removed from the bag or casing; further processed; repackaged in a heat tolerant container; exposed to a temperature of between about 160° F. and 205° F. for a period of between about 30 seconds and 10 minutes; and cooled.

DESCRIPTION OF THE PREFERRED EMBODIMENTS

The present invention provides a means for reducing the microbial numbers which are introduced during re-processing of cooked unpackaged processed meat products.

The microbes referred to here are generally those that can affect the shelf life and organoleptic quality of the food product. These include lactic acid organisms, aerobes and anaerobes.

It is well known that as microbial counts climb to 100,000 to 1,000,000 count/gram, the food product becomes increasingly unacceptable.

Although shelf life is a somewhat subjective barometer of food quality, organoleptic and other measures can be used to determine shelf life for a given food product.

The inventor has found that for example for roast beef, the shelf life using the post pasteurization process of the present invention is extended from 45 days (without reheating) to 60 to 90 days (with reheating).

For turkey breasts, shelf life using the post pasteurization process is extended from 21 to 31 days without the use of this process to between 60 and 90 days with the use of this process.

The invention has also been found useful in the treatment of ham. The presence of salt and nitrites in ham will also assist in shelf life, so that improvements attained by the use of the post pasteurization process of the present invention are less dramatic.

The optimum temperature range and dwell time for reheating cooked and repackaged food products is product dependent and also time/temperature related.

As an example, some high fat products such as sausage can only withstand a limited reheating before purge and discoloration.

In the case of ham and turkey breast products, it has been found that a temperature of between about 180° F. and 200° F., and more preferably about 190° F., held for between 60 and 90 seconds is optimal in reducing microbe count and extending shelf life.

Within any temperature range and dwell time range, generally the higher the temperature the lower the required dwell time to obtain optimum results.

While the exact effect on the bacteria or microbes from this post pasteurization treatment is not completely understood, it is suspected that the bacteria are either destroyed or injured so as to "inactivate" the bacteria and prevent product spoilage.

In a typical food processing operation, a meat product such as turkey breast or roast beef will be cooked in a cook-in bag such as a Cryovac CN 530 cook-in bag. After the cooking cycle is completed, the cooked food product is removed from the bag.

At this point, further processing such as the addition of colorants and seasonings, slicing or trimming of the food product, the addition of glazing (caramel) and similar processing is sometimes done. It is during this reprocessing that microorganisms typically destroyed or inactivated in the original cooking process can be reintroduced to the food surface. In the case of meat products, the growth of the microbe population can be especially rapid pending upon the exposure to personnel, equipment, and atmosphere in the processing facility.

The present invention provides an effective way of delaying the microbial growth created by such reprocessing. The reprocessed food product such as a meat product is packaged in a heat tolerant container or structure such as the CN 530 material used for the original heating process. Other heat tolerant materials, bags, pouches and structures may also be used depending on the time/temperature requirement and the degree of heat tolerance of the container, as well as other factors such as cost of the heat tolerant material.

The prepackaged food product is then exposed to a regime of high temperatures for a short period of time. It has been found that overall the optimal temperature ranges are between 160° F. and 205° F. The preferred dwell time is between about 30 seconds and 10 minutes.

The heating medium is preferably hot water, although steam (for example in a smoke house) or other hot liquids, or heated gasses such as heated air may also be used in some cases. In most applications and for most food products, hot water is the preferred heating medium.

The invention may be further understood by reference to the examples given below. The TBA values referred to in the examples refer to rancidity (fat breakdown). A standard test is used for determining TBA values, which measures the presence of breakdown products.

EXAMPLE 1

Twenty-four previously nonvacuumized whole hams were obtained approximately three days after production. Employing unsanitary practices (no gloves, etc.), the hams were removed from their stockinettes, halved and placed in either a B 540 (9"×20") barrier bag or a CN 530 (9" or 10") bag. Both of these bag products are available from W. R. Grace & Co.-Conn. through its Cryovac Division. All products were vacuumized and heat-sealed on a Koch/Multivac AG-800 machine. Nine half hams packaged in B 540 and nine packaged in CN 530 were shrunk for two seconds in a Groen Model 500 Water Cook Tank operating at 205° F. Samples treated in this manner served as experimental controls. The remainder of the CN 530-packaged hams (27) were exposed to 205° F. for either 30, 60 or 90 seconds in a Groen Model 500 to pasteurize the surface of the product. A three-minute period was allowed between each pasteurization treatment to ensure equilibrium of the cook tank temperature. All samples were chilled in an ice water bath immediately following pasteurization and were placed in an open display cabinet operating at 34° F. to 38° F. and 80 to 120 ft-c. Samples were evaluated after Day 1 and 6 weeks, 12 weeks and 18 weeks of storage.

Replicate ham samples were analyzed in duplicate or triplicate for the total aerobic (20° C.), total anaeorbic (20° C.), lactobacilli and pseudomonas counts after each storage period. During the first evaluation period, "swab" and "scalpel" sampling methods were employed. Both sampling techniques produced similar results so the "scalpel" method was used for all subsequent evaluation periods.

In addition to microbial analyses, pH and TBA values were determined on 18-week-old samples. Ham color and purge accumulation and viscosity were subjectively determined throughout the test.

The results are graphically summarized in Tables 1 and 2.

TABLE 1

Average Microbial Population on the Surface of Vacuum-Packaged Half Hams Exposed to 205° F. for 2, 30, 60 or 90 Seconds

| Organism | Treatment[d] | Organisms/gm[e] Day 1 | 6 Weeks | 12 Weeks | 18 Weeks |
|---|---|---|---|---|---|
| Total Aerobes | Barrier Bag | | | | |
| | ( 2 Sec.) | 2.18[a] | 6.01[a] | 6.77[a] | 6.48[a] |
| | CN 530 | | | | |
| | ( 2 Sec.) | 2.33[a] | 6.04[a] | 6.84[a] | 6.65[a] |
| | (30 Sec.) | 2.00[a] | 6.46[b] | 6.70[a] | 6.40[a] |
| | (60 Sec.) | 2.00[a] | 2.05[c] | 4.30[b] | 4.84[a] |

TABLE 1-continued

Average Microbial Population on the Surface of Vacuum-Packaged Half Hams Exposed to 205° F. for 2, 30, 60 or 90 Seconds

| Organism | Treatment[d] | Organisms/gm[e] Day 1 | 6 Weeks | 12 Weeks | 18 Weeks |
|---|---|---|---|---|---|
| | (90 Sec.) | 2.00[a] | 2.05[c] | 2.15[c] | 2.22[c] |
| Total Anaerobes | Barrier Bag | | | | |
| | ( 2 Sec.) | 2.00[a] | 6.00[a] | 6.37[a] | 5.66[a] |
| | CN 530 | | | | |
| | ( 2 Sec.) | 2.10[a] | 6.00[a] | 6.54[a] | 5.84[a] |
| | (30 Sec.) | 2.00[a] | 5.06[b] | 5.78[a] | 5.96[a] |
| | (60 Sec.) | 2.00[a] | 2.44[c] | 3.90[b] | 4.29[b] |
| | (90 Sec.) | 2.00[a] | 2.53[c] | 2.50[c] | 2.50[c] |
| Lactobacillus Organisms | Barrier Bag | | | | |
| | ( 2 Sec.) | 2.00[a] | 6.80[a] | 6.78[a] | 6.50[a] |
| | CN530 | | | | |
| | ( 2 Sec.) | 2.44[a] | 6.95[a] | 6.76[a] | 6.70[a] |
| | (30 Sec.) | 2.00[a] | 4.86[b] | 5.59[a] | 6.64[a] |
| | (60 Sec.) | 2.00[a] | 2.18[c] | 4.18[b] | 4.65[b] |
| | (90 Sec.) | 2.18[a] | 2.00[c] | 2.30[c] | 2.22[c] |

[abc]For each type of organism evaluated, any two means within a column having the same or one of the same letters are not significantly ($P < 0.05$) different (analysis conducted according to SAS General Linear Models Procedures).
[d]Treatment = Packaging material and length of exposure at 205° F.
[e]Mean Log of total counts on the surface of half hams.

TABLE 2

TBA and pH Values of Half Hams from Week 18 of Storage

| Packaging Material | Exposure Time at 205° F. | Mean pH Value | Mean TBA Value* |
|---|---|---|---|
| Barrier Bag | 2 Sec. | 5.25 | 0.37 |
| CN530 | 2 Sec. | 5.38 | 0.24 |
| CN530 | 30 Sec. | 5.18 | 0.34 |
| CN530 | 60 Sec. | 6.02 | 0.40 |
| CN530 | 90 Sec. | 6.02 | 0.36 |

*TBA values greater than 1.0 indicate rancidity.

During the test, the total aerobic population, the total anaerobic population and the lactobacilli organisms showed compatible responses due to pasteurization and storage. Pseudomonas organisms remained constant (<100) throughout the test, regardless of the treatment or the sampling period. Although there were no differences in the microbial population at Day 1, the microbial numbers of hams which were pasteurized for 60 or 90 seconds remained lower than other samples throughout the remainder of the test.

Table 1 indicates that hams which were pasteurized for 60 or 90 seconds had a microbial population which was significantly less than those found in Barrier Bag or CN 530 controls at each week of storage. Hams which were pasteurized for 30 seconds had counts which were significantly less than controls up to the 12th week of storage, but this difference in microbial numbers diminished by the 18th week of storage. From the results seen in Table 1, it appears that the 60- and 90-second pasteurization treatments, and to a lesser extent the 30-second treatment, significantly affected the outgrowth of all microbial inhabitants during storage. No differences could be seen in rancidity development (indicated by TBA values over 1.0), but hams which received a 60or 90-second pasteurization had pH values at Week 18 which were 0.64 to 0.84 pH units above the rest. Lower pH values (at 2 seconds and 30 seconds) are indicative of increased growth of lactic acid producing bacteria.

In addition to these results, visual evaluations were made. A visible, clear purge began to accumulate and increase in quantity after the first week of storage. CN 530 samples pasteurized for 30 seconds and Barrier Bag and CN 530 controls had a milky white purge after 12 weeks of storage. Hams pasteurized for 60 or 90 seconds had a clear purge accumulation which increased during the test. These latter two samples were judged to be acceptable though, as many processors only feel there is a loss in quality (shelf life) when a milky purge accumulates.

EXAMPLE 2

A precooked turkey product and a smoked sausage product were removed from the original packaging material and dipped into an inoculum suspension.

For purposes of this example, several inocula were prepared. These consisted of several species each of streptococcus faecium, salmonella spp. and Clostridium Sporogenes. Both mixed species and single species inocula were used.

The inoculated products were placed on a stainless steel rack and allowed to drain for at least two minutes to remove excess liquid. The inoculated product was then placed into Cryovac CN 530 bags and sealed using a Koch/Multivac A 300 packaging machine.

Immersion heating was accomplished using a water tank heated by steam injection with agitation to approximately 190° F. Immersion time was about 60 seconds. The product was then cooled immediately for about 60 seconds.

A mixed species inoculum was prepared by combining equal volumes of the single species inocula.

The results of immersing the inoculated products in the steam bath are itemized in Tables 3 through 5.

TABLE 3

Counts of *C. sporogenes* for uninoculated turkey breast and sausage, and turkey breast and sausage inoculated with *C. sporogenes* at the $10^6$ and $10^8$ spores/ml level in single (S) and mixed (M) species inocula.

| SAMPLE DESCRIPTION | INOCULUM TYPE | INOCULUM LEVEL | MEAN (CFU/IN$^2$) (turkey breast) | MEAN (CFU/IN$^2$) (Sausage) |
|---|---|---|---|---|
| uninoculated | — | — | $<1.0 \times 10^0$ | 1.0 $10^0$ |
| | | | $<1.0 \times 10^0$ | |
| inoculum | S | $10^6$ | $4.0 \times 10^4$ | $4.0 \times 10^4$ |
| unheated | S | $10^6$ | $1.2 \times 10^3$ | $2.1 \times 10^2$ |
| heated | S | $10^6$ | $7.8 \times 10^2$ | $2.0 \times 10^2$ |
| inoculum | M | $10^6$ | $5.3 \times 10^6$ | $5.3 \times 10^6$ |
| unheated | M | $10^6$ | $1.3 \times 10^3$ | $7.3 \times 10^2$ |
| heated | M | $10^6$ | $7.5 \times 10^2$ | $4.5 \times 10^2$ |
| inoculum | S | $10^8$ | $1.0 \times 10^7$ | $1.0 \times 10$ |
| unheated | S | $10^8$ | $6.6 \times 10^4$ | $4.2 \times 10^4$ |
| heated | S | $10^8$ | $6.6 \times 10^4$ | $2.1 \times 10^4$ |
| inoculum | M | $10^8$ | $4.0 \times 10^8$ | $4.0 \times 10^8$ |
| unheated | M | $10^8$ | $1.4 \times 10^5$ | $6.7 \times 10^4$ |
| heated | M | $10^8$ | $8.2 \times 10^4$ | $4.7 \times 10^4$ |

TABLE 4

Counts of Salmonellae for turkey breast and sausage inoculated with Salmonella at the $10^7$ and $10^9$ per ml level in single and mixed species inocula.

| SAMPLE DESCRIPTION | INOCULUM TYPE[1] | INOCULUM LEVEL | MEAN (CFU/IN$^2$) (turkey breast) | MEAN (CFU/IN$^2$) (Sausage) |
|---|---|---|---|---|
| inoculum | S | $10^7$ | $8.5 \times 10^6$ | $8.5 \times 10^6$ |
| unheated | S | $10^7$ | $2.5 \times 10^5$ | $1.4 \times 10^5$ |
| heated | S | $10^7$ | $9.8 \times 10^3$ | $8.7 \times 10^3$ |
| inoculum | M | $10^7$ | $1.4 \times 10^8$ | $1.4 \times 10^8$ |
| unheated | M | $10^7$ | $8.8 \times 10^4$ | $5.7 \times 10^4$ |
| heated | M | $10^7$ | $1.8 \times 10^3$ | $5.6 \times 10^3$ |
| inoculum | S | $10^9$ | $2.6 \times 10^8$ | $2.6 \times 10^8$ |
| unheated | S | $10^9$ | $1.4 \times 10^7$ | $5.0 \times 10^6$ |

TABLE 4-continued

Counts of Salmonellae for turkey breast and sausage inoculated with Salmonella at the $10^7$ and $10^9$ per ml level in single and mixed species inocula.

| SAMPLE DESCRIPTION | INOCULUM TYPE[1] | INOCULUM LEVEL | MEAN (CFU/IN$^2$) (turkey breast) | MEAN (CFU/IN$^2$) (Sausage) |
|---|---|---|---|---|
| heated | S | $10^9$ | $3.8 \times 10^5$ | $1.3 \times 10^6$ |
| inoculum | M | $10^9$ | $1.4 \times 10^{10}$ | $1.4 \times 10^{10}$ |
| unheated | M | $10^9$ | $2.3 \times 10^7$ | $3.5 \times 10^6$ |
| heated | M | $10^9$ | $3.6 \times 10^5$ | $4.8 \times 10^5$ |

TABLE 5

Counts of *S. faecium* for turkey breast and sausage inoculated with *S. faecium* at the $10^7$ and $10^9$ per ml level in single and mixed species inocula.

| SAMPLE DESCRIPTION | INOCULUM TYPE[1] | INOCULUM LEVEL | MEAN (CFU/IN$^2$ (turkey breast) | MEAN (CFU/IN$^2$ (Sausage |
|---|---|---|---|---|
| inoculum | S | $10^7$ | $3.6 \times 10^6$ | $3.6 \times 10^6$ |
| unheated | S | $10^7$ | $9.9 \times 10^4$ | $7.2 \times 10^4$ |
| heated | S | $10^7$ | $8.7 \times 10^3$ | $9.8 \times 10^3$ |
| inoculum | M | $10^7$ | $3.2 \times 10^8$ | $3.2 \times 10^8$ |
| unheated | M | $10^7$ | $9.9 \times 10^4$ | $9.8 \times 10^4$ |
| heated | M | $10^7$ | $8.7 \times 10^3$ | $8.6 \times 10^3$ |
| inoculum | S | $10^9$ | $4.6 \times 10^6$ | $4.6 \times 10^9$ |
| unheated | S | $10^9$ | $8.0 \times 10^6$ | $4.7 \times 10^6$ |
| heated | S | $10^9$ | $7.0 \times 10^5$ | $8.9 \times 10^5$ |
| inoculum | M | $10^9$ | $4.2 \times 10^{10}$ | $4.2 \times 10^{10}$ |
| unheated | M | $10^9$ | $2.7 \times 10^7$ | $5.0 \times 10^6$ |
| heated | M | $10^9$ | $6.8 \times 10^5$ | $1.1 \times 10^6$ |

The mean values are an average of between 1 and 3 replicate measurements, each replicate measure having two duplicates.

The results found in Tables 3 through 5 represent a "worse case" scenario and are somewhat artificial in that artificially high levels of microbial organisms were introduced to the surface of the test products. Even here, improvements were obtained.

EXAMPLE 3

A second study along the same lines as that of Example 2 was performed, using the same two products and three organisms found in Tables 3 through 5. In this study, pasteurization was performed at 205° F. for 2 minutes.

The results were substantially like those obtained by the treatment of Example 2.

EXAMPLE 4

Caramel-glazed cooked turkey breasts were exposed to a temperature of 195° F. in a shrink tunnel for 1 second, and then to the same temperature for a period of 90 seconds. It was found that the shelf life of the food product was extended from about 14 to 21 days of shelf life (without treatment) to about 60 days with the heat treatment just described.

EXAMPLE 5

Whole top rounds of whole muscle roast beef were injected 10% with a solution of salt and phosphates. They were packaged in a cook-and-strip material, CN 500, and were cooked to an internal temperature of 145° F. Following chilling, the beef was rubbed with a caramel-based seasoning, halved and packaged in CN 530.

Post-pasteurization was conducted at 205° F. for 5 minutes. Roast beef is an uncured item with lower salt levels which can withstand longer dwell times without any detrimental effect to product quality.

The results were about the same as for Example 1.

These in-house results are in agreement with actual production experience in the field. A 10-minute dwell time at 170° F. or a 5-minute exposure to 190° F. gave counts on split insides which were lower after 56 days than non-pasteurized controls after 28 days. In essence, the shelf life was doubled.

While the invention may be understood with respect to the examples describing specific embodiments of the invention, those skilled in the art will understand that appropriate modifications in both length of time and temperature range for pasteurization, depending on the particular product to be pasteurized, will become apparent to one skilled in the art after reviewing the specification.

What is claimed is:

1. A method of treating cooked meat products comprising:

(a) packaging the cooked meat product in a flexible heat-tolerant container;

(b) placing the packaged meat product in a heated medium kept at a temperature of between about 160° F. and 205° F.; and (c) maintaining the package in the heated medium for between about 30 seconds and 10 minutes.

2. The method of claim 1 wherein the packaged meat product is immersed into hot water.

3. The method of claim 1 wherein the immersed meat product is kept at a temperature of between about 180° F. and 200° F. for a period of between about 30 and 90 seconds.

4. A packaged meat product which has been:

(a) cooked in a bag or casing;

(b) removed from the bag or casing;

(c) further processed;

(d) repackaged in a heat tolerant container;

(e) exposed to a temperature of between about 160° F. and 205° F. for a period of between about 30 seconds and 10 minutes; and cooled.

* * * * *